Patented Oct. 19, 1937

2,096,662

UNITED STATES PATENT OFFICE 2,096,662

POLYCOUMARONE-RUBBER HYDROHALIDE COMPOSITIONS

Herbert A. Winkelmann and Eugene W. Moffett, Chicago, Ill., assignors to Marbon Corporation, a corporation of Delaware No Drawing. Application June 17, 1936, Serial No. 85,796

6 Claims. (Cl. 106—23)

This invention relates to an improved resin composition. We have found that the coumarone and indene resins are compatible in all proportions with the rubber hydrohalides and act as homogenizers and bonding agents. The rubber hydrohalides increase the toughness and strength of the polycoumarone and polyindenes. The compositions in general are useful as plastic or molding materials and also as coating compositions including lacquers and adhesives, the use depending on the type and proportions of the ingredients.

The amorphous, asymmetrical rubber hydrochloride, which is a soluble non-gelling type of rubber hydrochloride obtained by reacting undissolved sheet rubber with liquefied hydrogen chloride at −85° C. may be combined with all types of coumarone or indene resins to give compositions which may be dissolved in benzol, toluol or the like for use as coating compositions. The solubility and adhesive characteristics of this composition make it particularly adaptable for lacquers.

Example I

The following example will illustrate some formulae for lacquer compositions particularly adapted for coating glassine paper:

| | | |
|---|---|---|
| Amorphous saturated asymmetrical rubber hydrochloride | 100 | 100 |
| Coumarone resin M. P. 100° C.–160° C. | 50 | 10 |
| Paraffin wax | 5 | 5 |
| Magnesium oxide | 3 | 3 |
| Hexamethylene tetramine | 3 | 3 |

For lacquers of low viscosity the ingredients are fluxed together in a mill and after the milling treatment the product is dispersed in the volatile solvent.

Example II

The crystalline type rubber hydrochlorides may also be combined with the coumarone or indene resins. These compositions, being less soluble than the composition containing the amorphous rubber hydrochloride, are more useful for molding purposes than for lacquers or adhesives. The following composition is suitable for the production of floor tiling. It was compounded by fluxing the ingredients on a mill.

| | |
|---|---|
| Rubber hydrochloride | 100 |
| Polymerized tung oil | 25 |
| Coumarone resin M. P. (127°–142° C.) | 200 |
| Asbestos fibre | 200 |
| Whiting | 200 |
| MgO | 15 |

In place of the tung oil, linseed oil or other common and compatible plasticizers for the rubber hydrochloride and the coumarone resin may be used. For improved strength the composition is laminated with a fabric backing such as burlap or duck.

Example III

The following composition is suitable for dielectric plates and has been found of particular value in ozonizers. The molded plates or tube dielectrics made from this composition maintain good ozone yield under conditions of high humidity:

| | | |
|---|---|---|
| Saturated rubber hydrochloride | 100 | 100 |
| Coumarone resin (M. P. 150°–160° C.) | 50 | 25 |
| Magnesium oxide | 15 | 5 |

Example IV

The following composition is useful for tubing, gaskets, packing and the like where high tensile strength, and toughness combined with oil and gasoline resistance are important:

| | |
|---|---|
| Saturated crystalline rubber hydrochloride | 100 |
| Coumarone resin (M. P. 5°–30° C.) | 5 |
| Magnesium oxide | 15 |

Fillers such as blanc fixe, carbon black, etc., may be added as desired. The composition is prepared by milling and the uniform mixture thus produced is sheeted, cut to size and molded at, for example, 270° F. into shape.

Example V

The following composition, made by fluxing together on a mill, is a useful vulcanizate:

| | |
|---|---|
| Rubber hydrochloride | 100 |
| Coumarone resin, M. P. 20° C.–50° C. | 10 |
| Magnesium oxide | 10 |
| Litharge | 10 |
| Sulfur | 7 |
| Butyr aldehyde aniline | 5 |

The coumarone resins in general have their greatest value as homogenizing agents and plasticizers for rubber hydrochloride. Rubber hydrochloride stabilized with magnesium oxide, magnesium carbonate, litharge or other stabilizers, is fluxed on a mill and to the stabilized plastic mass is added a coumarone resin. This material acts on rubber hydrochloride similarly to its action on rubber. It combines with it readily and aids the incorporation of other materials such as blanc fixe, rayox, drying oils and the like into the mass. The soft coumarone resins which are fluid at room temperature act as plasticizers at room temperatures while all types which are or become fluid at ordinary mill temperatures (40° C.–160° C.) act as heat plasticizers and homogenizers on the mill. The preferred coumarone resins for general plasticizing purposes are those melting at about 15 to 30° C.

Coumarone resins have also been found to increase the solubility or the ease of dispersion in volatile solvents of the high temperature insoluble rubber and gaseous hydrogen chloride reaction products. These high temperature rubber hydrochlorides are normally so insoluble that boiling in benzol will leave from 20–70% residue. We have found that when 10 or more parts by weight of coumarone resins are incorporated in 100 parts of rubber prior to reaction with the gaseous hydrogen chloride the character of the resulting product is materially changed. The composition is readily dissolved in hot boiling benzol, and it fluxes and mills much more readily than the unmodified rubber hydrochloride. The resistance to lubricating oils, gasoline, water, however, remains high. Furthermore the molded products made by incorporating coumarone resins into the rubber, followed by reaction with hydrogen chloride, then milling and molding are superior in oil resistance to the molded products made by adding the coumarone resin to the rubber hydrochloride during the milling step. The reaction of rubber-coumarone resin to compositions with hydrogen chloride may be carried out not only with gaseous hydrogen chloride at elevated temperature but with gaseous or liquefied hydrogen chloride at any temperature, although the reactions with dry hydrogen chloride at elevated temperatures of, for example, 110° C. are generally more advantageous.

It should be understood that the proportions of rubber hydrochlorides and polycoumarones may be varied widely. For high tensile strength, however, the polycoumarone should be in minor proportions compared to the rubber hydrochlorides. For molding purposes we prefer to use a soft or fluid coumarone resin in less than 25 parts by weight per 100 of rubber hydrochloride.

We claim:

1. A composition comprising a rubber hydrochloride, a coumarone resin and sulfur.
2. A composition comprising a rubber hydrochloride, a coumarone resin, sulfur and a vulcanizing accelerator.
3. A composition comprising a rubber hydrochloride, a coumarone resin, sulfur, a vulcanizing accelerator, and a basic alkali earth compound.
4. A composition comprising a rubber hydrochloride, a coumarone resin, sulfur, a vulcanizing accelerator, magnesium oxide and litharge.
5. A plastic composition comprising as a major ingredient rubber hydrochloride, and each in minor proportion a soft coumarone resin, sulfur, butyr aldehyde aniline, magnesium oxide and litharge.
6. A composition having approximately the following composition, the proportions being in parts by weight:

| | |
|---|---|
| Rubber hydrochloride | 100 |
| Coumarone resin | 10 |
| Magnesium oxide | 10 |
| Litharge | 10 |
| Sulfur | 7 |
| Butyr-aldehyde aniline | 5 |

HERBERT A. WINKELMANN.
EUGENE W. MOFFETT.